United States Patent Office 3,752,661
Patented Aug. 14, 1973

3,752,661
DINITROPHENYLAZIDES AS HERBICIDES AND THEIR PREPARATION
Michael J. Orlett, Portsmouth, Ohio, assignor to Eli Lilly and Company, Indianapolis, Ind.
No Drawing. Continuation-in-part of abandoned application Ser. No. 760,687, Sept. 18, 1968. This application May 25, 1970, Ser. No. 40,398
Int. Cl. A01n 9/20, 13/00
U.S. Cl. 71—125                     9 Claims

ABSTRACT OF THE DISCLOSURE 2,6-dinitrophenylazides, useful as herbicides and as microbiocides are disclosed as is a process utilizing them as intermediates in the preparation of dinitroaniline-type herbicides.

Cross-reference

This application is a continuation-in-part of my copending application, Ser. No. 760,687 filed Sept. 18, 1968, now abandoned.

Background of the invention

Azide are known to be useful in the synthesis of esters and amides. For example, lysergic acid azide reacts with amines to yield lysergic acid amides, such as lysergic acid diethylamide. Phenylazides, however, do not undergo a similar displacement reaction. In fact, the azide group is bound quite strongly to the phenyl ring and has a tendency to react upon heating by the violent emission of nitrogen. Picrylazide is known to react with amines according to Ber. 54, 3183 (1921) and Bull. scient. Fac. Chim. ind. Bologna 1943 1. In a different type of reaction, o-nitrophenylazides also eliminate nitrogen upon heating, but form benzofuroxanes, also known as benzofurane-N-oxides [see Chem. Rev. 59 pp. 445, 448 (1959)]; which are quite stable.

Several dinitrophenylazides are known. Among these are: 2,4 - dinitrophenylazide—Powell, J. Am. Chem. Soc. 51, 2438 (1929), 2,4,6-trinitrophenylazide (picrylazide)—Schrader, Ber. 50, 777 (1917), 2,6-dinitro-4-chlorophenylazide and 2,6 - dinitro - 4 - bromophenylazide—Deorha et al., J. Ind. Chem. Soc. 40, 901 (1963), and 2,6-dinitro-p-tolylazide, 2,5 - dinitro-p-tolylazide and 2,4-dinitro-o-tolylazide—Drost, A. 313, 299 (1900).

Although sodium azide is known to have broad spectrum post-emergent herbicidal activity, phenylazides, and in particular, dinitrophenylazides are not known to have herbicidal activity.

Description

This invention provides a method of eliminating weeds from an area infested with weed seeds and growing weeds which comprises contacting said area with an effective amount of a 2,6-dinitrophenylazide represented by the formula:

(I)

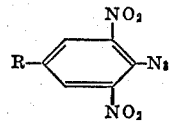

wherein R is hydrogen, $C_1$-$C_4$ alkyl, $C_3$-$C_8$ cycloalkyl, $C_1$-$C_3$ alkyloxy, nitro, halo, $C_1$-$C_3$ alkylsulfonyl, $C_1$-$C_3$ haloalkyl,

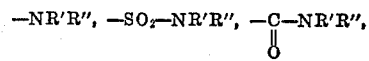

cyano, thiocyano,

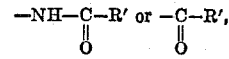

wherein R' and R" are individually hydrogen or $C_1$-$C_3$ alkyl, and wherein halo represents a halogen of atomic weight less than 130.

In the above formula, when R is $C_1$-$C_4$ alkyl, it can be methyl, ethyl, n-propyl, isopropyl, n-butyl, t-butyl, sec.-butyl and isobutyl. When R is $C_1$-$C_3$ haloalkyl, wherein said halo has an atomic weight below 130, it can be illustratively, difluoromethyl, fluoromethyl, pentafluoroethyl, heptafluoropropyl, heptafluoroisopropyl, iodomethyl, trichloromethyl, chloromethyl, bromomethyl, 3-bromopropyl and the like. When R is $C_3$-$C_8$ cycloalkyl, it can be illustratively cyclopropyl, cyclobutyl, cyclopentyl, cyclohexyl, cycloheptyl, or cyclooctyl. When R is $C_1$-$C_3$ alkyloxy, it can be methoxy, ethoxy, n-propoxy or isopropoxy. When R is $C_1$-$C_3$ alkylsulfonyl, it can be methylsulfonyl, ethylsulfonyl, n-propylsulfonyl, or isopropylsulfonyl. When R' or R" are $C_1$-$C_3$ alkyl, the alkyl groups can be methyl, ethyl, n-propyl, or isopropyl.

Illustrative compounds coming within the scope of the above formula include:

2,6-dinitro-4-chloromethylphenylazide
2,6-dinitro-4-butyrylaminophenylazide
2,6-dinitro-4-dichloromethylphenylazide
2,6-dinitro-4-trichloromethylphenylazide
2,6-dinitro-4-fluoromethylphenylazide
2,6-dinitro-4-isobutyrylphenylazide
2,6-dinitro-4-propionylphenylazide
2,6-dinitro-4-acetylphenylazide
2,6-dinitro-4-thiocyanophenylazide
N,N-diethyl-2,6-dinitro-4-carboxamidophenylazide
2,6-dinitro-4-n-butylphenylazide
N,N-dimethyl-2,6-dinitro-4-carboxamidophenylazide
2,6-dinitro-4-carboxamidophenylazide
2,6-dinitro-4-t-butylphenylazide
2,6-dinitro-4-cyclopropylphenylazide
2,6-dinitro-4-cyanophenylazide
2,6-dinitro-4-cyclopentylphenylazide
2,6-dinitro-4-aminophenylazide
2,6-dinitro-4-cyclooctylphenylazide
2,6-dinitro-4-methylaminophenylazide
2,6-dinitro-4-sulfonamidophenylazide
2,6-dinitro-4-dimethylaminophenylazide
N-methyl-N-n-propyl-2,6-dinitro-4-aminophenylazide N,N-dimethyl-2,6-dinitro-4-sulfonamidophenylazide
N-methyl-N-ethyl-2,6-dinitro-4-aminophenylazide
N,N-diethyl-2,6-dinitro-4-sulfonamidophenylazide
2,6-dinitro-4-di-n-propylaminophenylazide
2,6-dinitro-4-isopropylaminophenylazide
2,6-dinitro-4-n-propylaminophenylazide
2,6-dinitro-4-isopropoxyphenylazide
2,6-dinitro-4-methoxyphenylazide
2,6-dinitro-4-ethoxyphenylazide
2,6-dinitro-4-n-propylsulfonylphenylazide
2,6-dinitro-4-methylsulfonylphenylazide The preparation of representative 2,6-dinitrophenylazides coming within the scope of the above formula is illustrated by the following specific examples:

EXAMPLE I 2,6-dinitrophenylazide

Three grams of 2,6-dinitrochlorobenzene were dissolved in 150 ml. of dimethylformamide, and the solution warmed to about 40° C. About 1 g. of sodium azide was added. The resulting mixture was heated with stirring for about 2 hours at 65–70° C. and then poured into ice water. Fluffy yellow crystals precipitated which were separated by filtration. Recrystallization of the precipitate from aqueous ethanol yielded 2,6-dinitrophenylazide, melting at about 78–9° C. The azide structure was confirmed by NMR and IR spectra.

EXAMPLE II 2,6-dinitro-4-trifluoromethylphenylazide

Following the procedure of Example I, 2,6-dinitro-4-trifluoromethylchlorobenzene and sodium azide were reacted in a solvent consisting of 10 parts benzene, 1 part ethanol and 4 parts water. 2,6-dinitro-4-trifluoromethylphenylazide thus prepared melted at at about 53–5° C. after recrystallization from a benzenehexane solvent mixture.

The structure was confirmed by IR spectra.

*Analysis.*—Calcd. (percent): N, 25.27. Found (percent): N, 25.02.

EXAMPLE III 2,6-dinitro-p-tolylazide

Following the procedure of Example I, 3,5-dinitro-4-chlorotoluene and sodium azide were reacted in dimethylformamide to yield 2,6-dinitro-p-tolylazide which, after isolation and purification, crystallized as light yellow needles from aqueous ethanol; M.P.=95–6° C.

*Analysis.*—Calcd. (percent): C, 37.67; H, 2.26. Found (percent): C, 37.54; H, 2.66.

EXAMPLE IV 2,6-dinitro-4-chlorophenylazide

Following the procedure of Example I, 2,6-dinitro-1,4-dichlorobenzene and sodium azide were reacted in dimethylformamide to yield 2,6-dinitro-4-chlorophenylazide, which crystallized from aqueous ethanol in thin yellow plates; M.P.=about 84.5° C.

*Analysis.*—Calcd. (percent): C, 29.58; H, 0.93; N, 28.75. Found (percent): C, 29.61; H, 1.76; N, 29.17.

EXAMPLE V 2,6-dinitro-4-t-butylphenylazide

Following the procedure of Example I, 2,6-dinitro-4-t-butylchlorobenzene and sodium azide were reacted in dimethylformamide to yield 2,6-dinitro-4-t-butylphenylazide which crystallized as yellow needles from ethanol; M.P.=106–9° C.

*Analysis.*—Calcd. (percent): C, 45.28; H, 4.18; N, 26.41. Found (percent): C, 45.30; H, 4.31; N, 26.27.

Other compounds preparable by the above procedures are listed below with their analyses and certain physical properties.

Picryl azide (2,4,6-trinitrophenylazide). M.P.=90–3° C. *Analysis.*—Calcd. (percent): C, 28.36; H, 0.79; N, 33.07. Found (percent): C, 28.46; H, 0.94; N, 32.84.

2,6-dinitro-4-cyanophenylazide. M.P.=112–7° C. d. *Analysis.*—Calcd. (percent): C, 35.90; H, 0.86; N, 35.89. Found (percent): C, 36.15; H, 0.95; N, 35.61.

2,6-dinitro-4-sulfonamidophenylazide. M.P.=222–7° C. d. *Analysis.*—Calcd. (percent): C, 25.00; H, 1.40; N, 29.16. Found (percent): C, 25.24; H, 1.60; N, 28.90.

2,6-dinitro-4-carboxamido-N,N-dimethylphenylazide. M.P.=133° C. d. *Analysis.*—Calcd. (percent): C, 38.58; H, 2.88; N, 30.00. Found (percent): C, 38.82; H, 2.75; N, 29.79.

2,6-dinitro-4-carboxamidophenylazide. M.P.=116° C. d. *Analysis.*—Calcd. (percent): C, 33.34; H, 1.60; N, 33.33. Found (percent): C, 33.10; H, 1.72; N, 33.11.

2,6-dinitro-4-carboxamido-N-methylphenylazide. M.P.=142° C. d. *Analysis.*—Calcd. (percent): C, 36.10; H, 2.27; N, 31.58. Found (percent): C, 36.36; H, 2.33; N, 31.37.

2,6-dinitro-4-acetylphenylazide. M.P.=93–5° C. *Analysis.*—Calcd. (percent): C, 38.26; H, 2.01; N, 27.88. Found (percent): C, 38.41; H, 2.22; N, 27.62.

2,6-dinitro-4-cyclohexylphenylazide. M.P.=76–7° C. *Analysis.*—Calcd. (percent): C, 49.48; H, 4.50; N, 24.05. Found (percent): C, 49.68; H, 4.61; N, 23.92.

2,6-dinitro-4-n-propylphenylazide. *Analysis.*—Calcd. (percent): C, 43.03; H, 3.61; N, 27.88. Found (percent): 42.96; H, 3.80; N, 28.04.

2,6-dinitro-4-difluoromethylphenylazide. M.P.=35–8° C. *Analysis.*—Calcd. (percent): C, 32.45; H, 1.17; N, 27.03. Found (percent): C, 32.27; H, 1.39; N, 26.74.

2,6-dinitro-4-acetaminophenylazide. M.P.=108–9° C. *Analysis.*—Calcd. (percent): C, 36.10; H, 2.27; N, 31.58. Found (percent): C, 36.36; H, 2.32; N, 31.77.

2,6-dinitro-4-iodophenylazide. M.P.=71–3° C. *Analysis.*—Calcd. (percent): C, 21.51; H, 0.60; N, 20.90. Found (percent): C, 21.43; H, 0.72; N, 20.73.

2,6-dinitro-4-isopropylphenylazide. M.P.=46–50° C. *Analysis.*—Calcd. (percent): C, 43.03; H, 3.61; N, 27.88. Found (percent): C, 43.26; H, 3.34; N, 27.60.

2,6-dinitro-4-sec.-butylphenylazide. M.P.=37–9° C. *Analysis.*—Calcd. (percent): C, 45.28; H, 4.18; N, 26.41. Found (percent): C, 44.99; H, 4.42; N, 26.53.

2,6-dinitro-4-ethylphenylazide. M.P.=35–7° C. *Analysis.*—Calcd. (percent): C, 40.51; H, 2.97; N, 29.53. Found (percent): C, 40.25; H, 2.98; N, 29.48.

2,6-dinitro-4-fluorophenylazide. M.P.=27–9° C. *Analysis.*—Calcd. (percent): C, 31.73; H, 0.89; N, 30.84. Found (percent): C, 32.01; H, 0.92; N, 30.82.

2,6-dinitro-4-bromophenylazide. M.P.=84–7° C. *Analysis.*—Calcd. (percent): C, 25.02; H, 0.70; N, 24.32. Found (percent): C, 25.25; H, 0.79; N, 24.14.

As previously stated, the dinitrophenylazides represented by the above formula have herbicidal activity, both pre- and post-emergent. This activity is illustated by the following greenhouse trial wherein compounds were evaluated as pre- and post-emergent herbicides against both weeds and crops. In this evaluation, a soil was prepared consisting of one part masonry sand one part shredded top soil blended together in a cement mixer. One gallon of this soil was placed in a 25 x 35 cm. galvanized flat and was patted down with a bench brush until level. A three-row marker was used to make 2½ cm. deep furrows in approximately two-fifths of the flat. Crop seeds consisting of four kernels of corn, five cotton seeds and five soybean seeds were placed in soil and the indicated amounts of each of the following seeds were planted, one species to each section: foxtail (millet), 80–100 seeds; velvet leaf, 40–50 seeds; rough pigweed, 150–250 seeds; and large crabgrass, 100–150 seeds. Sufficient soil was added to cover the entire flat. Thus, the weed seeds were covered to a depth of about 6 mm. and the crop plant seeds were covered to a depth of about 3 cm.

In assaying the effect of the compositions as pre-emergent herbicides, a flat prepared as above, either on the day of planting or on the next day, was placed in a chamber equipped with a turntable and an air exhaust. The herbicidal composition, in the form of either a spray-type emulsion or a wettable powder, was applied to the flat with a modified De Vilbiss atomizer hooked to an air source. Twelve and one-half ml. of the composition under test were applied to each flat either on the day of planting or the succeeding day. For measuring the efficacy of the herbicidal compositions as post-emergent herbicides, the same experimental setup was used except that the flats were sprayed nine to twelve days after seeding, the length of growing time depending upon the season of the year and the light intensity. Injury ratings and observations as to type of injury were made eleven to twelve days after treatment. The injury rating scale used was as follows:

0—no injury
1—slight injury
2—moderate injury
3—severe injury
4—death

When more than one determination was carried out, an average value was calculated for the injury rating.

Each compound evaluated was formulated as a spray by one of the following procedures. In one method the particular compound was wetted by grinding in a mortar with one part of polyoxyethylene sorbitan monolaurate. Five hundred parts of water were added slowly to the resultant creamy paste to give an aqueous dispersion with a surfactant concentration of 0.2 percent. This dispersion was entirely satisfactory for spray application. In a second procedure the compound was dissolved in one volume of acetone, and the acetone solution was diluted with nineteen volumes of water containing 0.1 percent of polyoxyethylene sorbitan monolaurate.

In the following table setting forth the results of the evaluation, column 1 gives the name of the compound under test; column 2, the rate in pounds per acre at which the compound was applied to the test flat; and the remaining columns, the injury to the particular plant seeds or seedlings as measured by the foregoing scale.

TABLE 1

| Compound | Lb./acre | Pre-emergent treatment | | | | | | | Post-emergent treatment | | | | | | |
|---|---|---|---|---|---|---|---|---|---|---|---|---|---|---|---|
| | | Corn | Cotton | Soybeans | Crabgrass | Pigweed | Foxtail | Velvet leaf | Corn | Cotton | Soybeans | Crabgrass | Pigweed | Foxtail | Velvet leaf |
| 2,6-dinitro-4-chlorophenylazide | 8 | 0 | 0 | 0 | 0 | 0 | 0 | 0 | 0 | 2 | 0 | 3 | 2 | 1 | 0 |
| 2,6-dinitro-p-tolylazide | 8 | 1 | 0 | 0 | 3 | 4 | 2 | 0 | 1 | 4 | 2 | 4 | 4 | 4 | 4 |
| | 4 | 0 | 0 | 0 | 3 | 2 | 3 | 1 | 1 | 2 | 2 | 4 | 4 | 4 | 4 |
| | 2 | 0 | 0 | 0 | 2 | 0 | 1 | 0 | 1 | 2.5 | 1 | 4 | 3 | 3.5 | 2.5 |
| | 1 | 0 | 0 | 0 | 1 | 0 | 0 | 0 | 1 | 2 | 1.5 | 3.5 | 2 | 2.5 | 1 |
| | .5 | ---- | ---- | ---- | ---- | ---- | ---- | ---- | 0 | 0 | 0 | 2 | 2 | 2 | 1 |
| 2,6-dinitrophenylazide | 8 | 0 | 1 | 0 | 2 | 2 | 3 | 1 | 1 | ---- | 2 | 3 | 4 | 4 | 4 |
| | 4 | ---- | ---- | ---- | ---- | ---- | ---- | ---- | 1 | 1 | 1 | 3 | 2 | 3 | 4 |
| | 2 | ---- | ---- | ---- | ---- | ---- | ---- | ---- | 1 | 1 | 1 | 2 | 1 | 1 | 2 |
| | 1 | ---- | ---- | ---- | ---- | ---- | ---- | ---- | 1 | 1 | 1 | 1 | 2 | 1 | 0 |
| 2,6-dinitro-4-trifluoromethylphenylazide | 4 | 1 | 2 | 3 | 3 | 3 | 4 | 3 | 2 | 4 | 4 | 4 | 4 | 4 | 4 |
| | 2 | 0 | 0 | 2 | 3 | 3 | 3 | 2 | 1 | 2 | 4 | 3 | 4 | 4 | 3 |
| | 1 | 0 | 0 | 2 | 2 | 2 | 3 | 1 | 0 | 1 | 3 | 3 | 3 | 3 | 2 |
| | .5 | 0 | 0 | 1 | 0 | 0 | 1 | 0 | 0 | 0 | 2 | 0 | 0 | 2 | 2 |

Employing the same general procedure as in Table 1, six other compounds coming within the scope of the above formula were tested post-emergent at 8 pounds per acre against corn, large crabgrass, pigweed, foxtail, velvet leaf, morning glory, and zinnia. The quantities of seeds of the first five plants were the same as in the previous trial and 8–20 morning glory seeds and 20 zinnia seeds were used. Table 2, which follows, gives the results of this experiment using the same rating scale as before.

TABLE 2

| | Post-emergent treatment | | | | | | |
|---|---|---|---|---|---|---|---|
| Compound | Corn | Crabgrass | Pigweed | Foxtail | Velvet Leaf | Morning Glory | Zinnia |
| 2,6-dinitro-4-isopropylphenylazide | 4 | 3 | 2 | 4 | 1 | 2 | 2 |
| 2,4,6-trinitrophenylazide | 1 | 3 | 0 | 2 | 0 | 1 | 1 |
| 2,6-dinitro-4-iodophenylazide | 2 | 3 | 1 | 3 | 0 | 2 | 2 |
| 2,6-dinitro-4-acetylphenylazide | 4 | 3 | 1 | 3 | 0 | 2 | 2 |
| 2,6-dinitro-4-cyanophenylazide | 1 | 2 | 0 | 1 | 0 | 1 | 1 |

Following the same general procedure as in the two previous trails, four compounds coming within the scope of the above formula were tested against 21 plants species of the Graminaceae, including weeds, turf grasses and crops. The evaluation was carried out using the same procedures set forth above with the azides being applied 11 days post-emergent by spray to the plants. Table 3, which follows, gives the results of these tests. A rating scale from 0 to 10 is employed where 0 means no effect and 10 complete kill. In the table, column 1 gives the name of the compound, column 2 the application rate and columns through 23 the injury rating against the particular species of plant heading the column.

TABLE 3

| Compound | Lbs./acre | Annual blue grass | Large Crab-grass | Fox-tail millet | Wild oats | Wheat | Oats | Perennial rye-grass | Rye | Large crab-grass | Texas pani-cum | Barley | John-son grass | Sor-ghum | Witch-grass | Corn | Ripgut brome-grass | Goose-grass | Ky 31 fescue | Dallis grass | Kentucky blue-grass | Sand-bur | Penn-cross bent-grass | Yellow foxtail |
|---|---|---|---|---|---|---|---|---|---|---|---|---|---|---|---|---|---|---|---|---|---|---|---|---|
| 2,6-dinitrophenylazide | 1 | 1 | 9.5 | 9.5 | 0 | 1 | 2 | 4 | 1 | 10 | 8 | 0 | 8 | 7 | 10 | 3 | 2 | 9 | 2 | 3 | 5 | 6 | 2.5 | 6 |
|  | 2 | 1 | 10 | 10 | 5 | 1 | 2 | 6 | 3 | 10 | 8 | 1 | 9 | 7.5 | 10 | 3 | 2 | 10 | 6 | 7 | 8 | 9 | 9 | 8 |
|  | 3 | 1 | 10 | 10 | 0 | 1 | 3 | 8 | 4 | 10 | 10 | 3 | 10 | 9 | 10 | 6 | 6 | 10 | 2 | 7 | 8.5 | 8 | 8.5 | 8.5 |
| 2,6-dinitro-p-tolylazide | 1 | 2 | 10 | 10 | 0 | 1 | 0 | 2 | 2 | 10 | 6 | 0 | 6 | 4 | 10 | 4 | 3 | 10 | 0 | 4 | 3.5 | 8 | 1 | 9 |
|  | 2 | 3 | 10 | 10 | 0 | 2 | 1 | 7.5 | 1 | 10 | 9.5 | 2 | 10 | 7 | 10 | 4 | 2 | 10 | 0 | 5 | 7 | 10 | 8 | 9.5 |
|  | 3 | 3 | 10 | 10 | 0 | 2 | 1 | 7.5 | 2.5 | 8 | 4 | 1 | 4 | 9 | 8 | 5 | 2 | 10 | 0 | 6 | 8.5 | 9 | 9 | 10 |
| 2,6-dinitro-4-chlorophenylazide | 1 | 1 | 1 | 3 | 0 | 0 | 0 | 0 | 1 | 8 | 6 | 1 | 4 | 2 | 6 | 2.5 | 1 | 1 | 0 | 2 | 0 | 2 | 0 | 3 |
|  | 2 | 2 | 3 | 4 | 0 | 0 | 0 | 0 | 1 | 9 | 3.5 | 1 | 3 | 3 | 7 | 3 | 1 | 2 | 0 | 3 | 3 | 4 | 1 | 6 |
|  | 3 | 3 | 3 | 9 | 0 | 0 | 0 | 0 | 2 | 1 | 0 | 2 | 3 | 0 | 1 | 1 | 2 | 3 | 0 | 3.5 | 0 | 6 | 2 | 5 |
| 2,6-dinitro-4-trifluoromethylphenylazide | 1 | 1 | 1 | 1 | 0 | 0 | 0 | 0 | 1 | 0 | 0 | 1 | 0 | 1 | 1 | 1 | 1 | 0 | 0 | 0 | 0 | 0 | 0 | 0 |
|  | 2 | 2 | 2 | 3 | 0 | 0 | 0 | 0 | 2 | 3 | 0 | 1 | 0 | 1 | 1 | 1 | 1 | 0 | 0 | 0 | 0 | 0 | 0 | 0 |

The preferred herbicide of this invention is 2,6-dinitro-p-tolylazide. Its post-emergent activity against 14 crops and weeds was determined following the above procedure. The same quantity of seeds were used as indicated in the previous examples. Where the crop or weed variety had not previously been used, a proportionate number of seeds, depending upon size, were employed. Table 4, which follows, sets forth the results of the post-emergent testing of 2,6-dinitro-p-tolylazide. In the table, column 1 gives the pounds per acre and columns 2 through 13 the injury rating for the plant species indicated.

TABLE 4.—POST-EMERGENT TESTING OF 2,6-DINITRO-p-TOLYLAZIDE

| Application rate, lbs./a. | Barnyard grass | Rice | Large Crab-grass | Corn | Foxtail millet | Sorghum | Texas panicum | Ragweed | Cotton | Pigweed | Peanuts | Lambsquarters | Soybeans | Morning glory |
|---|---|---|---|---|---|---|---|---|---|---|---|---|---|---|
| 1 | 7 | 0 | 9.5 | 1 | 9.5 | 3 | 4 | 0 | 2 | 8 | 3 | 6 | 3 | 1 |
| 2 | 9 | 0 | 10 | 2.5 | 10 | 4 | 6 | 1 | 4 | 8.5 | 3 | 3 | 2 | 3.5 |
| 4 | 9 | 1 | 10 | 6.5 | 10 | 9 | 9 | 2.5 | 7 | 10 | 4 | 5 | 3.5 | 7 |

The usual application rate for applying phenylazides coming within the scope of the above formula is from 0.25 to 32 lbs. per acre. The dinitrophenylazides coming within the scope of the above formula can be formulated in a variety of ways for application to soil areas, paddies, or other areas infested with growing weeds and weed seeds. Among these herbicidal formulations are included wettable powders, emulsifiable concentrates, and solid formulations on selected carriers. Typical formulations are set forth below using 2,6-dinitro-p-tolylazide as the active ingredient for illustrative purposes only.

FORMULATION 1

Solid formulation on fertilizer 2,6-dinitro-p-tolylazide was dissolved in an aromatic naphtha solvent and deposited upon a 4–12–4 fertilizer to give a dry spreadable formulation having the following active ingredient present in an amount equal to 0.184 percent. 2,6-dinitro-p-tolylazide, .184 percent. Other typical formulations are listed below in terms of total content of 2,6-dinitro-p-tolylazide and inert ingredients.

(A) Granular formulations (1)

|  | Percent |
|---|---|
| 2,6-dinitro-p-tolylazide | 12.5 |
| Methylated naphthalene solvent | 13.0–15.0 |
| Attapulgite clay granules | 74.5–72.5 |

(2)

|  | Percent |
|---|---|
| 2,6-dinitro-p-tolylazide | 5.0 |
| Methylated naphthalene solvent | 6.0 |
| Attapulgite clay granules | 89.0 |

(3)

|  | Percent |
|---|---|
| 2,6-dinitro-p-tolylazide | 1.0–2.0 |
| Aromatic naphtha solvent | 1.0–3.0 |
| No. 4 vermiculite | 95.0–98.0 |

(4)

|  | Percent |
|---|---|
| 2,6-dinitro-p-tolylazide | 0.5 |
| Aromatic naphtha solvent | 4.5 |
| Granular diatomaceous earth | 95.0 |

(5)

|  | Percent |
|---|---|
| 2,6-dinitro-p-tolylazide | 1.0–2.0 |
| Aromatic naphtha solvent | 0.5–3.5 |
| Corncob grit | 94.5–98.5 |

(B) Liquid concentrate formulations (1)

|  | Percent |
|---|---|
| 2,6-dinitro-p-tolylazide | 35.0–37.5 |
| Emulsifier | 2.5–5.0 |
| Xylene solvent | 57.0–61.5 |

(2)

|  | Percent |
|---|---|
| 2,6-dinitro-p-tolylazide | 46.0–49.0 |
| Emulsifier | 3.5–5.0 |
| Xylene solvent | 46.0–49.5 |

(3)

| | Percent |
|---|---|
| 60–69% 2,6-dinitro-p-tolylazide solution in aromatic naphtha solvent | 69.0–75.0 |
| Emulsifier | 7.0 |
| Xylene solvent | 18.5–25.0 |

In the above liquid formulations, the emulsifier can be any suitable anionic or non-ionic surfactant or a mixture of these two types of surfactants. Typical of the latter are blends containing three parts of the calcium salt of myristylbenzene sulfonic acid to one part of the oleate ester of a polyoxyethylene glycol (M.W.=350) or seven parts of the calcium salt of laurylphenolsulfonic acid to three parts of mono- and di-resin acid esters of polyoxyethylene glycol (M.W.=500). Other non-ionic surfactants which are commonly blended with the anionic surfactants listed above include polyoxyethylene sorbitan monolaurate. A particularly useful emulsifier combination for use in the liquid formulation No. 3 above includes 2.1% of an alkylarylsulfonate and 4.9% of an anionic non-ionic surfactant mixture containing a magnesium salt of a cetylphenolsulfonic acid and a mono- and di-resin acid ester of a polyoxyethylene glycol (M.W.=400). Other suitable emulsifiers will readily suggest themselves to those skilled in the art.

Certain of the dinitrophenylazides coming within the scope of the above formula have a remarkable selectivity in that they are able to eliminate weed grasses, such as crabgrass, foxtail millet, and barnyard grass from rice paddies in which the rice is already growing after either direct seeding or transplanting. Among the dinitrophenylazides preferred for their selective herbicidal effect in rice are those represented by Formula II (II)

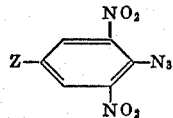

wherein Z is methyl, ethyl, isopropyl, sec.-butyl, fluoro, chloro, bromo, iodo, difluoromethyl, acetyl, acetamino or hydrogen. Compounds represented by Formula II are applied to the paddy when the rice is from 2 to 5 inches in height, if direct seeded, and from 6–8 inches in height if transplanted, and prior to flooding. The preferred application rate in rice paddies is from about 0.25 to about 4 lbs. per acre. The compounds can be formulated as previously illustrated, although emulsifiable concentrates are preferred. The compounds should be applied about 9 days after seeding or transplanting in order to achieve maximal herbicidal effectiveness although treatment can be instituted up to two weeks after direct seeding or transplanting with appreciable effect against even the most stubborn of the common grass weeds, such as barnyard grass, and with excellent kill of more susceptible species. The time of applying the compounds will depend in part upon the time for flooding the paddy since the compounds should be applied at least 2 days before flooding in order to obtain their best effects.

The selective activity of the dinitrophenylazides of Formula II in killing grass weeds in rice paddies without harming the rice is illustrated by the following experiment in which three strains of rice (Natio, Brazilian Upland, and Early Colusa II), 2 strains of barnyard grass (California and Arkansas), large crabgrass and foxtail millet were seeded into flats by the method previously indicated. The flats were sprayed two weeks after seeding with a herbicide in the form of an emulsifiable concentrate diluted with water. The results of this experiment are given in Table 5 below in which the 0 to 10 rating scale previously described is used. In the table, column 1 gives the name of the compound, column 2 the application rate in lbs. per acre and columns 3 to 9 the injury rating for the plant species indicated at the top of the column.

TABLE 5

| Compound | Lbs./acre | Rice | | | Barnyard grass | | Large crabgrass | Foxtail millet |
|---|---|---|---|---|---|---|---|---|
| | | Nato | Brazilian Upland | Early Colusa II | Calif. | Ark. | | |
| 2,6-dinitrophenylazide | 1 | 1 | 0 | 0 | 2.5 | 5 | 9 | 9 |
|  | 2 | 1 | 0 | 0 | 2.5 | 5 | 9.5 | 10 |
|  | 3 | 5 | 5 | 4 | 5 | 9.5 | 10 | 10 |
| 2,6-dinitro-p-tolylazide | 1 | 1 | 0 | 0 | 5 | 8 | 9.5 | 10 |
|  | 2 | 2 | 1 | 2 | 7 | 10 | 10 | 10 |
|  | 3 | 5 | 2 | 0 | 8 | 10 | 10 | 10 |
| 2,6-dinitro-4-chlorophenylazide | 1 | 1 | 1 | 0 | 1 | 4 | 7 | 9 |
|  | 2 | 1 | 1 | 0 | 4 | 8 | 10 | 10 |
|  | 3 | 1 | 0 | 0 | 5 | 9 | 10 | 10 |
| 2,6-dinitro-4-isopropylphenylazide | 1 | 0 | 0 | 0 | 0 | 8 | 7.5 | 3 |
|  | 2 | 0 | 0 | 0 | 0 | 10 | 9.5 | 9 |
|  | 3 | 0 | 3 | 2 | 2 | 10 | 9.5 | 9 |
| 2,6-dinitro-4-iodophenylazide | 1 | 0 | 0 | 0 | 0 | 6 | 0 | 0 |
|  | 2 | 0 | 2 | 0 | 2 | 5 | 2 | 2 |
|  | 3 | 2 | 2 | 1 | 3 | 8 | 6 | 6 |

2,6-dinitrophenylazide, 2,6 - dinitro - p - tolylazide, and 2,6-dinitro-4-chlorophenylazide were tested more extensively against barnyard grass in the presence of growing rice. Two different treatment times were used, 9 to 13 days after seeding to both rice and barnyard grass. At 9 days the rice averaged 2.75 inches in height and the barnyard grass 4.75 inches in height. At 13 days the rice average 6.75 inches in height and the barnyard grass 7.5 inches. Three different observation times were also employed: 2 days, 7 days, and 21 days. The results of this trial are given in Table 6 which follows. In the table, column 1 gives the name of the compound, column 2 the application rate in lbs. per acre, columns 3, 5, and 7 the injury rating to rice on treatment 9 days after planting as observed 2 days, 7 days and 21 days after treatment respectively, columns 4, 6 and 8, similar information for barnyard grass, columns 9, 11, and 13, injury to rice on treatment 13 days after planting as observed 2 days, 7 days, and 21 days after treatment and columns 10, 12, and 14 similar information on barnyard grass.

TABLE 6

| Name of compound | Lbs./acre | Treatment 9 days after seeding | | | | | | Treatment 13 days after seeding | | | | | |
|---|---|---|---|---|---|---|---|---|---|---|---|---|---|
| | | 2[1] | | 7[1] | | 21[1] | | 2[1] | | 7[1] | | 21[1] | |
| | | Plant | | | | | | Plant | | | | | |
| | | Rice | B.G. | Rice | B.G. | Rice | B.G. | Rice | B.G. | Rice | B.G. | Rice | B.G. |
| 2,6-dinitro-p-tolylazide | 1 | 0 | 9.5 | 1 | 10 | 0 | 10 | 0 | 5 | 0 | 6 | 0 | 6 |
| | 1.5 | 0 | 10 | 1.5 | 10 | 0 | 10 | 0 | 6 | 0 | 7 | 0 | 6.5 |
| | 2 | 1 | 10 | 1.5 | 10 | 0 | 10 | 1 | 7 | 0 | 8 | 0 | 6.5 |
| 2,6-dinitro-4-chlorophenylazide | 1 | 1 | 4 | 1 | 6 | 0 | 9 | 0 | 1 | 0 | 1 | 0 | 2 |
| | 2 | 0 | 5 | 1 | 6 | 0 | 7.5 | 0 | 2 | 0 | 1 | 0 | 4 |
| | 3 | 0 | 8 | 1 | 8 | 0 | 9.8 | 1 | 3 | 1 | 1 | 0 | 3 |

[1] Observation day.

NOTE.—B.G.=Barnyard grass.

2,6-dinitro-p-tolylazide was evaluated for its ability to control grass weeds in rice at lower application rates than those previously employed. In this experiment the rice variety was Early Colusa II and the barnyard grass was California variety. The herbicide was applied 8 or 9 days after treatment when the rice was 0.5" tall and the barnyard grass 2.25" tall. Observations of damage were made 7 days after treatment. Table 7, which follows, gives the results of this experiment. In the table, column 1 gives the treatment rate in lbs. per acre, columns 2 and 3 the injury rating (using the same scale as heretofore) for treatment 7 days after planting and columns 4 and 5 the injury rating on application 8 days after planting.

TABLE 7

| Application rate in lbs./acre | Treatment 7 days after seeding | | Treatment 8 days after seeding | |
|---|---|---|---|---|
| | Rice (Early Colusa) | Barnyard grass (Calif.) | Rice (Early Colusa) | Barnyard grass (Calif.) |
| 0.25 | 0 | 5.8 | 0 | 6.5 |
| 0.50 | 0 | 10 | 0 | 9.0 |
| 0.75 | 0 | 10 | 0 | 10 |
| 1.0 | 0 | 10 | 0 | 10 |

As discussed hereinabove, the novel compounds there described can be employed in a wide variety of embodiments. In all such embodiments, the described compounds can also be formulated and employed with known herbicides of other classes. The ratio of the individual components of such compositions to one another is not critical; all ratios provide compositions that have useful plant growth altering properties. However, generally preferred compositions are those wherein a substantial portion of each component is present—such as compositions wherein the ratio of the components ranges from 1:10 to 10:1, and especially from 1:5 to 5:1. Among the known plant growth altering substances which can be combined with the active agent of this invention to yield compositions useful for plant growth regulation are the following compounds. When a compound is here listed as an acid or comprehends any readily modified functional group, its salts, esters, and other derivatives are also comprehended.

(I) Substituted ureas 3-(3,4-dichlorophenyl)-1,1-dimethylurea
3-(4-chlorophenyl)-1,1-dimethylurea
1,1-dimethyl-3-phenylurea
1-n-butyl-3-(3,4-dichlorophenyl)-1-methylurea
3-(4-chlorophenyl)-1-methyl-1-(1-methyl-2-propynyl)urea
3-(3,4-dichlorophenyl)-1-methoxy-1-methylurea
1,1-dimethyl-3-(m-(trifluoromethyl)phenyl)urea
3-(3-chloro-4-methoxyphenyl)-1,1-dimethylurea
3-(hexahydro-4,7-methanoindan-5-yl)-1,1-dimethylurea
3-cyclooctyl-1,1-dimethylurea
3-(4-chlorophenoxy-phenyl)-1,1-dimethylurea
3-(3-(N-isopropylcarbamoyloxy)phenyl)-1,1-dimethylurea The active agent of the present invention can be formulated with compounds of other classes to produce useful and advantageous compositions. The ratio of the individual components of such compositions to one another is not critical; all ratios provide compositions that have useful plant growth altering properties. However, generally preferred compositions are those wherein a substantial portion of each component is present—such as compositions wherein the ratio of the components ranges from 1:10 to 10:1, and especially from 1:5 to 5:1. Among the known plant growth altering substances which can be combined with the active agent of this invention to yield compositions useful for plant growth regulation are the following compounds. When a compound is here listed as an acid or comprehends any readily modified functional group, its salt, esters, and other derivatives are also comprehended.

(I) Substituted ureas 3-(3,4-dichlorophenyl)-1,1-dimethylurea
3-(4-chlorophenyl)-1,1-dimethylurea
1,1-dimethyl-3-phenylurea
1-n-butyl-3-(3,4-dichlorophenyl)-1-methylurea
3-(4-chlorophenyl)-1-methyl-1-(1-methyl-2-propynyl)urea
3-(3,4-dichlorophenyl)-1-methoxy-1-methylurea
1,1-dimethyl-3-(m-(trifluoromethyl)phenyl)urea
3-(3-chloro-4-methoxyphenyl)-1,1-dimethylurea
3-(hexahydro-4,7-methanoindan-5-yl)-1,1-dimethylurea
3-cyclooctyl-1,1-dimethylurea
3-(4-(4-chlorophenoxy)phenyl)-1,1-dimethylurea
3-(3-(N-isopropylcarbamoyloxy)phenyl)-1,1-dimethylurea
3-(4-chlorophenyl)-1-methoxy-1-methylurea
3-(4-bromophenyl)-1-methoxy-1-methylurea
3-(4-bromo-3-chlorophenyl)-1-methoxy-1-methylurea
1-(2-methylcyclohexyl)-3-phenylurea
1,3-bis(1-hydroxy-2,2,2-trichloroethyl)urea
1,1-dimethyl-3-phenylurea monotrichloroacetate
3-(4-chlorophenyl)-1,1-dimethylurea monotrichloroacetate
1-(4-chlorophenyl)-2,3,3-trimethylpseudourea
1-(3,4-dichlorophenyl)-2,3,3-trimethylpseudourea
1-benzoyl-1-(3,4-dichlorophenyl)-3,3-dimethylurea

(II) Substituted triazines 2-chloro-4,6-bis(ethylamino)-s-triazine
2-chloro-4-ethylamino-6-isopropylamino-s-triazine
2,4-bis(isopropylamino)-6-methoxy-s-triazine
2-diethylamino-4-isopropylacetamido-6-methoxy-s-triazine
2,4-bis(isopropylamino)-6-methylthio-s-triazine
2-ethylamino-4-isopropylamino-6-methoxy-s-triazine
2,4-bis(ethylamino)-6-methylthio-s-triazine
2-isopropylamino-4-methylamino-6-methylthio-s-triazine
2-ethylamino-4-isopropylamino-6-methylthio-s-triazine
2,4-bis(ethylamino)-6-methoxy-s-triazine
2-chloro-4,6-bis(isopropylamino)-s-triazine
2-tert-butylamino-4-ethylamino-6-methylthio-s-triazine
2,4-bis((3-methoxypropyl)amino)-6-methylthio-s-triazine
2-chloro-4,6-bis(diethylamino)-s-triazine
2-chloro-4-diethylamino-6-ethylamino-s-triazine
2-chloro-4-diethylamino-6-isopropylamino-s-triazine
2-chloro-4-ethylamino-6-(1-cyano-1-methylethylamino)-s-triazine
2-sec-butylamino-4-ethylamino-6-methoxy-s-triazine 2-tert-butylamino-4-isopropylamino-6-methylthio-s-triazine
2-(1-cyano-1-methylethylamino)-4-ethylamino-6-methylthio-s-triazine
2-(1-cyano-1-methylethylamino)-4-isopropylamino-6-methylthio-s-triazine
2-azido-4-isopropylamino-6-methylthio-s-triazine
2-sec-butylamino-4-isopropylamino-6-methylthio-s-triazine
2,4-bis(isopropylamino)-6-ethylthio-s-triazine
2-azido-4-tert-btuylamino-6-ethylamino-s-triazine
2-tert-butylamino-4-chloro-6-ethylamino-s-triazine
2-tert-butylamino-4-ethylamino-6-methoxy-s-triazine
2-ethylamino-4-ethylthio-6-isopropylamino-s-triazine
2-azido-4-sec-butylamino-6-methylthio-s-triazine
2-tert-butylamino-4-methylamino-6-methylthio-s-triazine
2-chloro-4-cyclopropylamino-6-isopropylamino-s-triazine
2-(4-chloro-6-ethylamino-s-triazin-2-ylamino)-2-methyl-butyronitrile (III) Phenols 2-sec-butyl-4,6-dinitrophenol
4,6-dinitro-2-(1-methylbutyl)phenol
pentachlorophenol
4,6-dinitro-o-cresol (IV) Benzoic acids chlorinated benzoic acid
2,3,6-trichlorobenzoic acid
2,3,5,6-tetrachlorobenzoic acid
2-methoxy-3,5,6-trichlorobenzoic acid
3,6-dichloro-2-methoxybenzoic acid
3-amino-2,5-dichlorobenzoic acid
2,5-dichloro-3-nitrobenzoic acid (V) Phenoxy compounds 2-(2,4-dichlorophenoxy)acetic acid
2-(2,4-dichlorophenoxy)propionic acid
2-(2,4,5-trichlorophenoxy)acetic acid
2-(4-chloro-o-tolyloxy)acetic acid
2-(2,4,5-trichlorophenoxy)propionic acid
2-(2,4,5-trichlorophenoxy)ethyl 2,2-dichloropropionate
4-(2,4-dichlorophenoxy)butyric acid
4-(4-chloro-o-tolyloxy)butyric acid
tris(2-(2,4-dichlorophenoxy)ethyl)phosphite
3-(4-chloro-o-tolyloxy)propionic acid
2-(2,4-dichlorophenoxy)ethyl benzoate
2-(2,4,5-trichlorophenoxy)ethyl sodium sulfate
2-(2,4-dichlorophenoxy)ethyl sodium sulfate
2-(4-chloro-o-tolyloxy)ethyl sodium sulfate (VI) Benzonitriles 2,6-dichlorobenzonitrile
3,5-diiodo-4-hydroxybenzonitrile
3,5-dibromo-4-hydroxybenzonitrile (VII) Chlorinated aliphatic acids trichloroacetic acid
2,2-dichloropropionic acid (VIII) Carbamates S-ethyl di-n-propylthiocarbamate
S-n-propyl di-n-propylthiocarbamate
S-n-propyl n-butylethylthiocarbamate
S-ethyl diisobutylthiocarbamate
S-ethyl cyclohexylethylthiocarbamate
S-ethyl hexahydro-1H-azepine-1-carbothioate
S-isopropyl hexahydro-1H-azepine-1-carbothioate
2-chloroallyl diethyldithiocarbamate
S-(2,3-dichloroallyl) diisopropylthiocarbamate
S-(2,3,3-trichloroallyl) diisopropylthiocarbamate
isopropyl carbanilate
isopropyl 3-chlorocarbanilate
methyl 3,4-dichlorocarbanilate
4-chloro-2-butynyl 3-chlorocarbanilate
methyl sulfanilylcarbamate
3,4-dichlorobenzyl methylcarbamate
2,3-dichlorobenzyl methylcarbamate
4-cyano-2,6-diiodophenyl methylcarbamate
2,6-di-tert-butyl-p-tolyl methylcarbamate
sodium methyldithiocarbamate
2-(phenylcarbamoyl)ethyl n-butylcarbamate
3-methoxycarboxamidophenyl 3-methylcarbanilate
m-propionamidophenyl isopropylcarbamate (IX) Phenylacetic acids 2-(2,3,6-trichlorophenyl)acetic acid (X) Uracils 3-cyclohexyl-5,6-trimethyleneuracil
5-bromo-3-sec-butyl-6-methyluracil
5-bromo-3-tert-butyl-6-methyluracil
5-bromo-3-isopropyl-6-methyluracil
3-tert-butyl-5-chloro-6-methyluracil (XI) Dinitroanilines N,N-di-n-propyl-2,6-dinitro-4-(trifluoromethyl)aniline
N,N-di-n-propyl-2,6-dinitro-4-methylaniline
N-ethyl-N-butyl-2,6-dinitro-4-(trifluoromethyl)aniline
N,N-di-n-propyl-2,6-dinitro-4-(methylsulfonyl)aniline
N,N-di-n-propyl-2,6-dinitro-4-sulfamoylaniline
N,N-di-n-propyl-2,6-dinitro-4-isopropylaniline
N,N-di-n-propyl-2,6-dinitro-4-tert-butylaniline (XII) Diphenyl ethers m-tolyl p-nitrophenyl ether
p-nitrophenyl 2,4-dichlorophenyl ether
p-nitrophenyl 2,4,6-trichlorophenyl ether
p-nitrophenyl (4-(trifluoromethyl)-2-nitrophenyl ether (XIII) Inorganics phenylmercuric acetate
sodium tetraborate hydrated
sodium metaborate
sodium pentaborate
polyborochlorate
unrefined borate ore such as borascu
sodium chlorate
calcium propylarsonate
disodium methanearsonate
monosodium methanearsonate
calcium methanearsonate
monoammonium methanearsonate
octyl-dodecylammoniummethylarsonate
sodium arsenite
arsenic acid
cacodylic acid
arsenic trioxide
ammonium sulfamate
potassium azide
lead arsenate
calcium arsenate
potassium cyanate
calcium cyanamide
methanearsonic acid
magnesium chlorate (XIV) Amides N,N-dimethyl-2,2-diphenylacetamide
N-isopropyl-2-chloroacetanilide
N,N-diethyl-2-chloroacetamide
N,N-diallyl-2-chloroacetamide
N-(isopropoxymethyl)-N-(2,6-xylyl)-2-chloroacetamide
N-(isobutoxymethyl)-N-(2,6-xylyl)-2-chloroacetamide
N-(methoxymethyl)-N-(6-tert-butyl-o-tolyl)-2-chloro-acetamide
N-(methoxymethyl)-N-(2,6-diethylphenyl)-2-chloro-acetamide N-(n-butoxymethyl)-2-chloro-2',6'-diethylacetanilide
2-chloro-N-(2,6-diethyl-1-cyclohexen-1-yl)-N-(2-n-butoxyethyl)acetamide
6-tert-butyl-2-chloro-o-acetotoluidide
4-chloro-N,N-di-n-propylcinnanamide
N-(3,4-dichlorophenyl)propionamide
3',4'-dichloro-2-methylacrylanilide
3'-chloro-2-methyl-p-valerotoluidide
3',4'-dichlorocyclopropanecarboxanilide
N-(5-chloro-2-thiazolyl)propionamide
N-methoxy-2-(4-chloro-o-tolyloxy)acetamide
N,N-diethyl-2-methyl-2-(1-naphthyloxy)acetamide
N-(1,1-dimethylpropyl)-3,5-dichlorobenzamide
N-(hydroxymethyl)-2,6-dichlorothiobenzamide
2-(2,6-dinitro-4-toluidino)-N-methylpropionamide
2-(4-chloro-o-tolyloxy)propionanilide
3',4'-dichloropropionanilide
3'-chlorobenzanilide
1-(ethylcarbamoyl)ethyl carbanilate
1-(isopropylcarbamoyl)ethyl 3-chlorocarbanilate (XV) Phthalic acids N-(1-naphthyl)phthalamic acid
dimethyl 2,3,5,6-tetrachloroterephthalate
methyl 2,3,5,6-tetrachloro-4-(methylthio)carbonylbenzoate
methyl 2,3,5,6-tetrachloro-N-methoxy-N-methylterephthalamate (XVI) Pyridazinones 5-amino-4-chloro-2-phenyl-3(2H)-pyridazinone
4-chloro-5-dimethylamino-2-(m-(trifluoromethyl)phenyl)-3(2H)-pyridazinone (XVII) Triazinones 3-methylthio-6-isopropyl-4-amino-as-triazin-5(4H)-one
3-methylthio-6-cyclohexyl-4-amino-as-triazin-5(4H)-one
3-methylthio-6-phenyl-4-amino-as-triazin-5(4H)-one
1-(3,4-dichlorophenyl)-3,5-dimethylhexahydro-s-triazin-2(4H)-one
1-phenyl-3-methyl-5-allylhexahydro-s-triazin-2(4H)-one
4-amino-3-methylthio-6-tert-butyl-as-triazin-5(4H)-one (XVIII) Miscellaneous acrolein
3-amino-1,2,4-triazole
O,O-diisopropyl S-(2-(phenylsulfonamido)ethyl)phosphorodithioate
2-methyl-6-(trifluoromethyl)benzimidazole
2-isopropyl-6-(trifluoromethyl)benzimidazole
2-isopropyl-6-chlorobenzimidazole
5-methylsulfonyl-2-(trifluoromethyl)benzimidazole
2,6-bis(trifluoromethyl)-4-nitrobenzimidazole
3-(p-tert-butylphenylsulfonyl)acrylonitrile
2,3,5 ltrichloro-4-pyridinol
6,7-dihydrodipyrido[1,2-a:2',1'-c]pyrazinedium salts
α-(2,2,2,-trichloroethyl)styrene
7-oxabicyclo(2.2.1)heptane-2,3-dicarboxylic acid
hexachlorocyclopentadiene
2-trifluoromethyl-6-chloro-1H-imidazo(4,5-b)pyridine
3-o-tolyloxypyridazine
1,1'-dimethyl-4,4'-bipyridiniium salts
4-amino-3,5,6-trichloropicolinic acid
O-methyl O-(2,4-dichlorophenyl) isopropylphosphoramidothioate
2,3,6-trichlorobenzyloxypropanol
2-amino-3-chloro-1,4-naphthoquinone
hexachloroacetone
trichlorobenzyl chloride
sodium cis-3-chloroacrylate
4,5,7-trichloro-2,1,3-benzothiadiazole
1-(3,4-dichlorophenyl)-3-methyl-2-pyrrolidinone
1-(3-chloro-p-tolyl)-3-methyl-2-pyrrolidinone
ethyleneglycol bis(trichloroacetate)
diphenylacetonitrile
maleic hydrazide
allyl alcohol
(1,1-dimethyl-2-chloroethyl)trimethylammonium chloride
tri-n-butyl 2,4-dichlorobenzylphosphorium chloride
(4-hydroxycarvacryl)trimethylammonium chloride, ester with 1-piperidinecarboxylic acid
O,O-diethyl dithiobis(thioformate)
tetrahydro-3,5-dimethyl-2H-1,3,5-thiadiazine-2-thione
(benzamidoöxy)acetic acid
methyl 2-chloro-9-hydroxyfluorene-9-carboxylate
n-butyl 9-hydroxyfluorene-9-carboxylate
4-dimethylaminophenyl thiocyanate
5-tert-butyl-3-(2,4-dichloro-6-isopropoxyphenyl)-1,3,4-oxadiazol-2(3H)-one
5-tert-butyl-3-(2,4-dichloro-5-isopropoxyphenyl)-1,3,4-oxadiazol-2(3H)-one
2-(3,4-dichlorophenyl)-4-methyl-1,2,4-oxadiazolidine-3,5-dione
N(3,5-dibromo-4-hydroxybenzylidene)-2,4-dinitraniline
4-chlorobenzenesulfone-o-toluidide In a second aspect of this invention, there is provided a method for preparing 2,6-dinitroanilines according to the following reaction scheme:

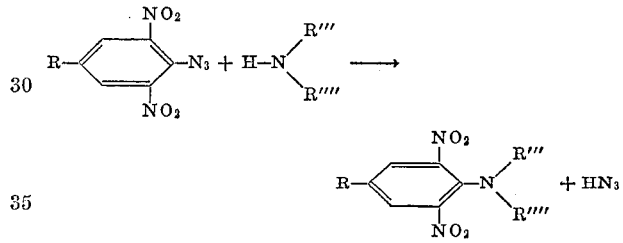

wherein R has the same meaning as hereinabove, and R''' and R'''' are the same or different members of the group consisting of hydrogen $C_1$–$C_7$ alkyl, $C_3$–$C_5$ alkenyl, $C_3$–$C_5$ alkynyl, halo-substituted $C_1$–$C_5$ alkyl, $C_3$–$C_5$ alkenyl or $C_3$–$C_5$ alkynyl wherein halo has an atomic weight below 85, $C_1$–$C_3$ alkyloxy-substituted $C_1$–$C_5$ alkyl, di-($C_1$–$C_3$ alkyloxy-substituted)$C_1$–$C_5$ alkyl, $C_3$–$C_8$ cycloalkyl and $C_5$–$C_8$ cycloalkenyl, with the proviso that only one of R''' and R'''' can be hydrogen; and R''' and R'''', when taken together with the nitrogen atom to which they are attached, are pyrrolidyl, piperidyl, hexamethyleneiminyl, heptamethyleneiminyl or morpholinyl.

Groupings illustrating the scope of the above radicals include the following: methoxyethyl, ethoxyethyl, n-propoxyethyl, dimethoxyethyl, 2-ethoxypropyl, 4-isopropoxypropyl, trifluoromethyl, pentafluoroethyl, 3-chloropropyl, trichloromethyl, perfluoro-n-pentyl, bromomethyl, methyl, ethyl, n-propyl, isopropyl, n-butyl, isobutyl, sec.-butyl, n-amyl, isoamyl, sec.-amyl, 1-methylisobutyl, allyl, propargyl, 2-butynyl, 1-butynyl, 3-methyl-1-butynyl, crotyl, methallyl, 2-pentynyl, 2-pentyl, 3-pentyl, 2-hexyl, chlorallyl, bromopropargyl, 3-hexyl, 2-heptyl, 3-heptyl, 4-heptyl, 3-methyl-2-butyl, 3-methyl-2-pentyl, 4-methyl-3-hexyl, 3,4-dimethyl-2-pentyl, 3-methyl-2-hexyl, 4-methyl-2-hexyl, 5-methyl-2-hexyl, cyclopropyl, cyclobutyl, cyclopentyl, $\Delta^2$-cyclopentenyl, cyclohexyl, $\Delta^2$-cyclohexenyl, $\Delta^3$-cyclohexenyl, cycloheptenyl, $\Delta^4$-cyclooctenyl and the like.

The above reaction can be carried out either in an inert solvent such as benzene or in an excess of the amine. The following example illustrates the novel process.

EXAMPLE VI

Trifluralin

Ten grams of 2,6-dinitro-4-trifluoromethylphenylazide were dissolved in 100 ml. of di-n-propylamine at 25° C. The reaction mixture was stirred for about 6 hours and then poured slowly into dilute aqueous hydrochloric acid. α,α,α-Trifluoro-2,6-dinitro - N,N - di - n - propyl-p-toluamine (trifluralin) thus prepared was extracted from the aqueous acid solution with ether, and the ether was removed by evaporation in vacuo. Chromatography of the residue over florisil using benzene as a solvent yielded authentic trifluralin or orange crystals.

The 2,6-dinitroanilines preparable by the above reaction are useful as herbicides according to U.S. Pats. 3,332,769; 3,257,190; 3,321,292; 3,227,734 and 3,367,949, and as fungicides according to U.S. Pats. 3,067,254 and 3,102,803.

I claim:

1. A method of eliminating weeds from an area infested with weed seeds and growing weeds which comprises contacting said area with an effective amount of a 2,6-dinitro-phenylazide represented by the formula

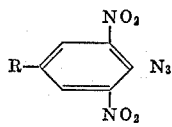

wherein R is hydrogen, $C_1$–$C_4$ alkyl, $C_3$–$C_8$ cycloalkyl, $C_1$–$C_3$ alkyloxy, nitro, halo, $C_1$–$C_3$ alklsulfonyl, $C_1$–$C_3$ haloalkyl,

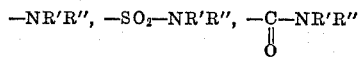

cyano, thiocyano,

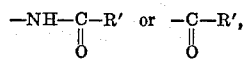

wherein R′ and R″ are individually hydrogen or $C_1$–$C_3$ alkyl, and wherein halo represents a halogen of atomic weight less than 130.

2. A method according to claim 1, wherein 2,6-dinitro-p-tolylazide is the active herbicide.

3. A method according to claim 1, wherein 2,6-dinitrophenylazide is the active herbicide.

4. A method according to claim 1, wherein 2,6-dinitro-4-difluoromethylphenylazide is the active herbicide.

5. A method according to claim 1 in which the 2,6-dinitrophenylazide is applied at a rate from 0.25 to 32 lbs. per acre.

6. The method of eliminating grass weeds from rice paddies in which a substituted-phenylazide of the formula

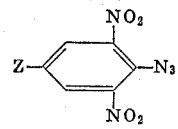

wherein Z is methyl, ethyl, isopropyl, sec.-butyl, fluoro, chloro, bromo, iodo, difluoromethyl, acetyl, acetamino or hydrogen is applied post-emergent to both weeds and rice prior to flooding.

7. A method according to claim 6 in which the substituted-phenylazide is applied at a rate of from 0.25 to 4 lbs. per acre.

8. A method according to claim 6 in which 2,6-dinitro-p-tolylazide is applied.

9. A method according to claim 6 in which 2,6-dinitro-4-difluoromethylphenylazide is applied.

References Cited
UNITED STATES PATENTS

| | | | |
|---|---|---|---|
| 3,257,190 | 6/1966 | Soper | 71—121 |
| 3,232,958 | 1/1966 | Washburn | 71—79 X |
| 3,376,127 | 4/1968 | McConnell et al. | 71—66 |

OTHER REFERENCES

Powell, J. Am. Chem. Soc., 51, (1929), 2438.
Schrader, Ber., 50, 777 (1917).
Deorha et al., J. Ind. Chem. Soc., 40, 901 (1963).
Drost, A., 313, 299 (1900).

JAMES O. THOMAS, JR., Primary Examiner

U.S. Cl. X.R.

71—80, 103, 104, 105, 118, 121, 123, 124; 260—239 B, 247, 247.1, 247.2 R, 247.7, 293, 293.4, 294, 294.7, 454, 465.e, 556 B, 558 R, 562 R

UNITED STATES PATENT OFFICE
CERTIFICATE OF CORRECTION

Patent No. 3,752,661  Dated August 14, 1973

Inventor(s) Michael J. Orlett

It is certified that error appears in the above-identified patent and that said Letters Patent are hereby corrected as shown below:

Column 1, line 25, "Azide" should read --Azides--.

Column 3, line 30, "NMR" should read --nmr--.

Column 3, line 67, "H, 0.93" should read --H, 0.83--.

Column 3, line 39, "at at" should read --at--.

Column 4, line 37, "42.96" should read -- C, 42.96--.

Column 4, line 64, "illustated" should read --illustrated--.

Column 5-6, in Table 2, second line, under Compound, "trinintrophenylazide" should read --trinitrophenylazide--.

Column 6, line 63, "trails" should read --trials--.

Column 6, line 73, "columns through" should read --columns 3 through--.

Column 10, line 19, "Natio" should read --Nato--.

Column 10, line 59, "9 to 15" should read --9 and 13--.

Column 10, line 63, "average" should read --averaged--.

Column 11, line 16, "conrtol" should read --control--.

Column 15, line 14, "dimethylpropyl" should read --dimethylpropynyl--.

Column 15, line 55, "2,3,5,1trichloro" should read --2,3,5-trichloro--.

UNITED STATES PATENT OFFICE
CERTIFICATE OF CORRECTION

Patent No. 3,752,661  Dated August 14, 1973

Inventor(s) Michael J. Orlett

It is certified that error appears in the above-identified patent and that said Letters Patent are hereby corrected as shown below:

Column 16, line 21, "dinitraniline" should read --dinitroaniline--.

Column 16, line 63, "cycloheptenyl, $\Delta^4$-cyclooctenyl and the like." should read --cycloheptenyl, $\Delta^2$-cycloheptenyl, cyclooctenyl, $\Delta^3$-cyclooctenyl, $\Delta^4$-cyclooctenyl and the like.--.

Signed and sealed this 17th day of September 1974.

(SEAL)
Attest:

McCOY M. GIBSON JR.
Attesting Officer

C. MARSHALL DANN
Commissioner of Patents